(12) United States Patent
Kanai (10) Patent No.: US 7,010,161 B2
(45) Date of Patent: Mar. 7, 2006

(54) IMAGE PROCESSING DEVICE, IMAGE PROCESSING METHOD, AND COMPUTER READABLE MEDIUM STORING PROGRAM FOR IMAGE COLOR CORRECTION WITH PRIORITY TO ONE OF COLOR REPRODUCTION AND BRIGHTNESS

(75) Inventor: Masashi Kanai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 650 days.

(21) Appl. No.: 10/106,879

(22) Filed: Mar. 27, 2002

(65) Prior Publication Data

US 2003/0012434 A1   Jan. 16, 2003

(30) Foreign Application Priority Data

Mar. 28, 2001   (JP) .............................. 2001-092793

(51) Int. Cl.
  *G06K 9/00* (2006.01)
  *G03F 3/08* (2006.01)

(52) U.S. Cl. ....................................... 382/167; 358/518

(58) Field of Classification Search ................ 382/162, 382/164, 165, 167; 358/500, 501, 504, 505, 358/509, 515, 516, 518, 520; 348/645, 692; 345/207, 418, 530, 589, 601, 602, 619, 676
See application file for complete search history.

(56) References Cited

U.S. PATENT DOCUMENTS

| | | | | |
|---|---|---|---|---|
| 5,111,285 A | * | 5/1992 | Fujita et al. ................. | 358/500 |
| 5,309,257 A | * | 5/1994 | Bonino et al. .............. | 358/504 |
| 5,313,275 A | * | 5/1994 | Daly et al. .................. | 348/592 |
| 5,568,284 A | * | 10/1996 | Oku et al. ................... | 358/518 |
| 5,949,496 A | * | 9/1999 | Kim ............................ | 348/645 |
| 5,978,106 A | * | 11/1999 | Hayashi ...................... | 358/518 |
| 6,125,199 A | * | 9/2000 | Sato et al. ................... | 382/162 |
| 6,795,576 B1 | * | 9/2004 | Uchida et al. .............. | 382/164 |
| 2005/0030305 A1 | * | 2/2005 | Brown et al. ............... | 345/207 |

FOREIGN PATENT DOCUMENTS

| | | |
|---|---|---|
| JP | 1-167791 | 7/1989 |
| JP | 7-203230 | 8/1995 |
| JP | 7-287560 | 10/1995 |
| JP | 9-270925 | 10/1997 |
| JP | 2000-50086 | 2/2000 |

* cited by examiner

*Primary Examiner*—Andrew W. Johns
*Assistant Examiner*—Amir Alavi
(74) *Attorney, Agent, or Firm*—Lowe Hauptman & Berner, LLP (57) ABSTRACT

An image processing device 20, which provides an image input signal having been subjected to a desired color correction using a color correction table to an image output device, stores in a color correction LUT storage section 20c a color correction table with priority to color reproduction for making a color correction permitting the execution of a faithful color reproduction and a color correction table with priority to brightness for making a color correction with priority to brightness. A color corrector 20b reads from the color correction LUT storage section 20c a color correction table (LUT) selected by a color correction LUT selector 20i, and a desired color correction is performed by reference to the color correction LUT thus read. In this way, it is possible to effect a color reproduction according to a desire of a user or the purpose of use.

18 Claims, 12 Drawing Sheets

IMAGE PROCESSING DEVICE, IMAGE PROCESSING METHOD, AND COMPUTER READABLE MEDIUM STORING PROGRAM FOR IMAGE COLOR CORRECTION WITH PRIORITY TO ONE OF COLOR REPRODUCTION AND BRIGHTNESS

BACKGROUND ART

1. Technical Field of the Invention

The present invention relates to an image processing for an image input signal which processing is performed in the case of transforming a color space of the image input signal into a color space of an image output device.

2. Related Art

A color reproduction region differs depending on devices such as scanner, monitor, printer, and projector. Thus, it comes into question how such difference in color reproduction region is to be absorbed in color reproduction.

For example, in the case of color transformation (color correction) from a color reproduction region of a monitor to a color reproduction region of a printer, it comes into question which color present in the color reproduction region of the printer is to be used to represent a color present in the color reproduction region of the monitor and not present in the color reproduction region of the printer.

Such a color transformation processing is a method of mapping image data into a color capable of being represented by an output device, which method is generally called a color matching method.

SUMMARY OF THE INVENTION

However, a conventional color management system is provided with only one processing method for implementing the color matching method. Thus, it has been impossible to effect a color reproduction matching the desire of a user or an intended use.

More particularly, according to users' desires or uses, there is a case where a color transformation able to effect a faithful color reproduction is desired even at the sacrifice of lightness and there is a case where a color transformation with priority given to brightness and able to retain lightness is desired even if there occurs a slight color shift.

The present invention has been accomplished for solving the above-mentioned problem and it is an object of the invention to provide an image processing device and an image processing method, which can reproduce colors according to users' desires and uses, as well as a program and a recording medium.

According to an aspect of the present invention an image processing device wherein an image input signal which has been subjected to a desired color correction using a color correction table is provided to an image output device, includes: a color correction table with priority to color reproduction which color correction table is for making a color correction permitting the execution of a faithful color reproduction; and a color correction table with priority to brightness which color correction table is for making a color correction with priority to brightness.

According to the thus constructed image processing device wherein an image input signal which has been subjected to a desired color correction using a color correction table is provided to an image output device, it is possible to reproduce colors according to users' desires and uses, since the image processing device includes a color correction table with priority to color reproduction which color correction table is for making a color correction permitting the execution of a faithful color reproduction; and a color correction table with priority to brightness which color correction table is for making a color correction with priority to brightness.

According to an aspect of the present invention, the color correction table with priority to color reproduction transforms a color point in a color space of the image input signal into a color point in a color space of the image output device, in a color space constructed such that a white color point in a color space of an input image data and a maximum luminance point having the same chromaticity as that of the white color point and having a maximum luminance in the color space of the image output device are substantially coincident with each other. By using the thus constructed color correction table, it is possible to execute a faithful color reproduction.

According to an aspect of the present invention, the color correction table with priority to brightness transforms a color point in a color space of the image input signal into a color point in a color space of the image output device, in a color space constructed such that a white color point in a color space of input image data and a white color point in the image output device are substantially coincident with each other By using the thus constructed color correction table with priority to brightness, it is possible to execute a color reproduction with retaining lightness.

According to an aspect of the present invention, the image processing device further includes: selector means for selecting either the color correction table wit priority to color reproduction or the color correction table with priority to brightness, and the desired color correction is performed using the color correction table selected by the selector means.

According to an aspect of the present invention, the selector means selects the color correction table with priority to color reproduction or the color correction table with priority to brightness in accordance with the image input signal, and the desired color correction is performed using the selected color correction table.

According to an aspect of the present invention, the color correction table with priority to brightness is selected in the case where the image input signal is fed from a terminal for a computer signal. In the case of an input signal provided from a personal computer, the retention of brightness is preferred because it is presumed that much character data will be contained therein.

According to an aspect of the present invention, the color correction table with priority to color reproduction is selected in the case where the image input signal is fed from a terminal for a video signal. In the case of an input signal provided from a television, a faithful color reproduction is preferred because natural pictures are reproduced in many cases.

According to an aspect of the present invention, an image processing method wherein an image input signal which has been subjected to a desired color correction using a color correction table is provided to an image output device, uses: a color correction table with priority to color reproduction which color correction table is for making a color correction permitting the execution of a faithful color reproduction; and a color correction table with priority to brightness which color correction table is for making a color correction with priority to brightness.

According to an aspect of the present invention, provided is a computer-readable medium storing a program of instructions for execution by the computer to perform an image processing wherein an image input signal which has been subjected to a desired color correction using a color correction table is provided to an image output device, the image processing using: a color correction table with priority to color reproduction which color correction table is for making a color correction permitting the execution of a faithful color reproduction; and a color correction table with priority to brightness which color correction table is for making a color correction with priority to brightness.

DESCRIPTION OF THE PREFERRED EMBODIMENTS

The embodiment of the present invention will be described in detail hereinafter with referring to the attached drawings.

Figure 1:
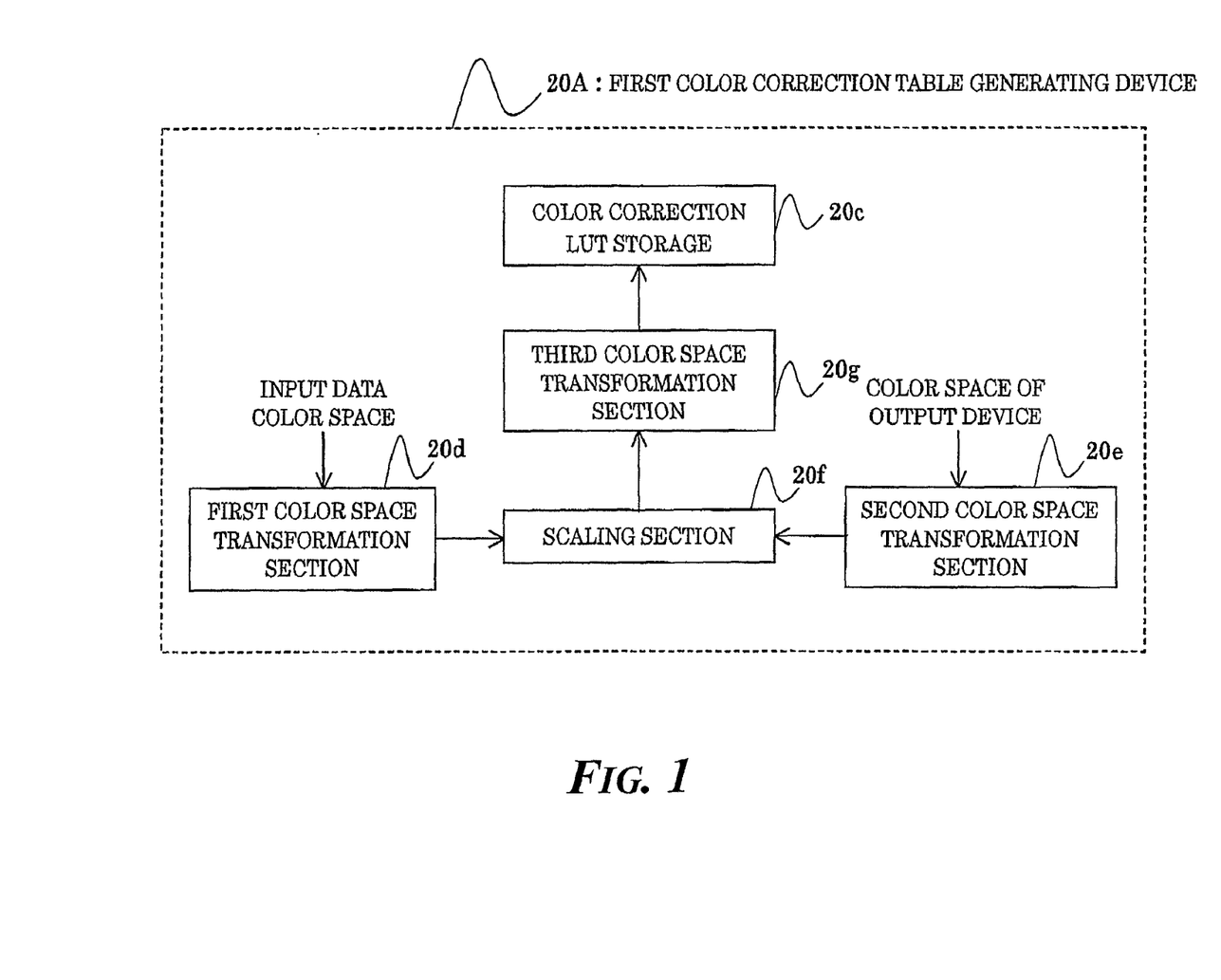
FIG. 1 is a functional block diagram of a color correction table generating device according to a first embodiment of the present invention.
Figure 2:
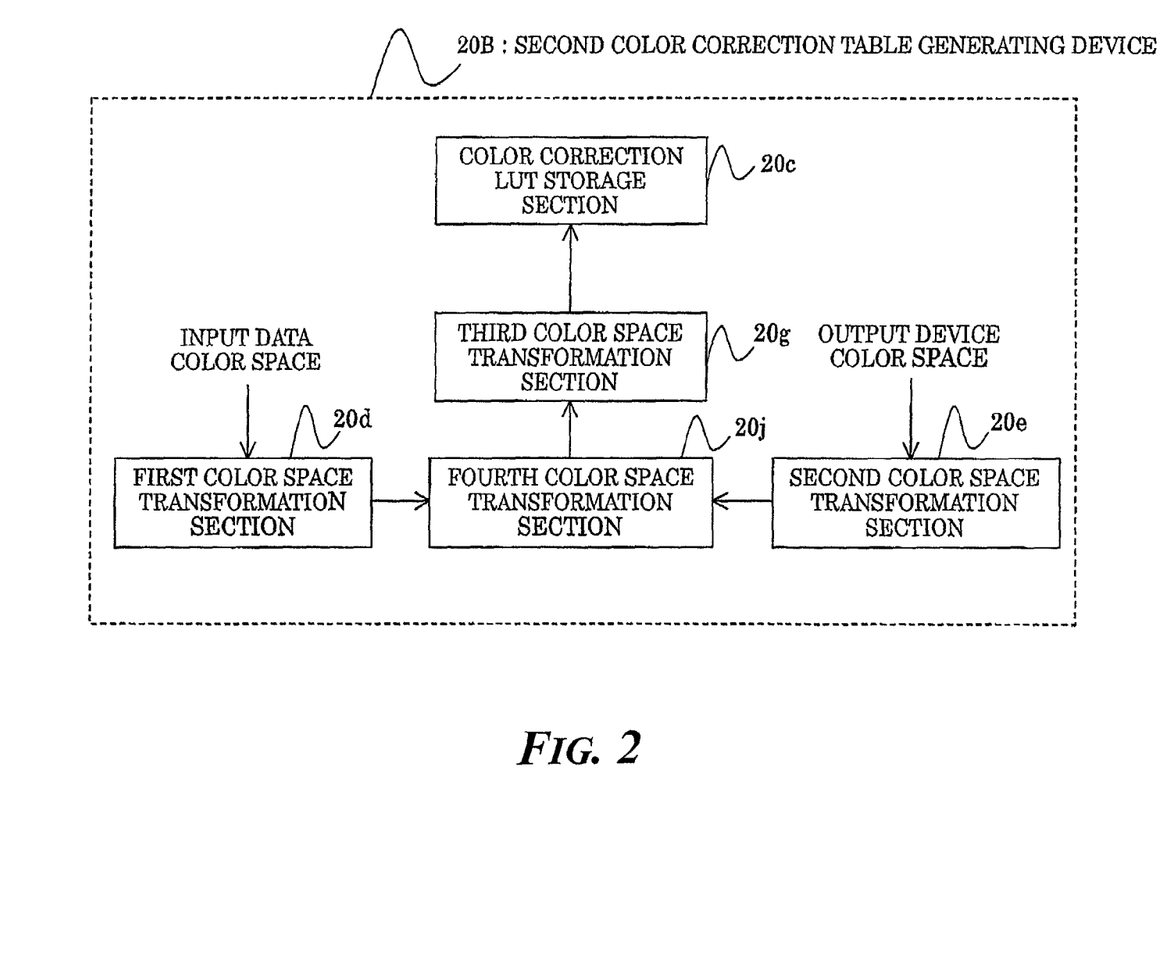
FIG. 2 is a functional block diagram of a color correction table generating device according to a second embodiment of the present invention.

FIG. 1 is a functional block diagram showing a color correction table generating device 20A according to a first embodiment of the present invention, which is referred to as a first color correction table generating device, and FIG. 2 is a functional block diagram showing a color correction table generating device 20B according to a second embodiment of the present invention, which is referred to as a second color correction table generating device. The first color correction table generating device 20A generates a color correction table for making a faithful color reproduction; and the second color correction table generating device 20B generates a color correction table for making a color correction with priority to brightness.

Figure 4:
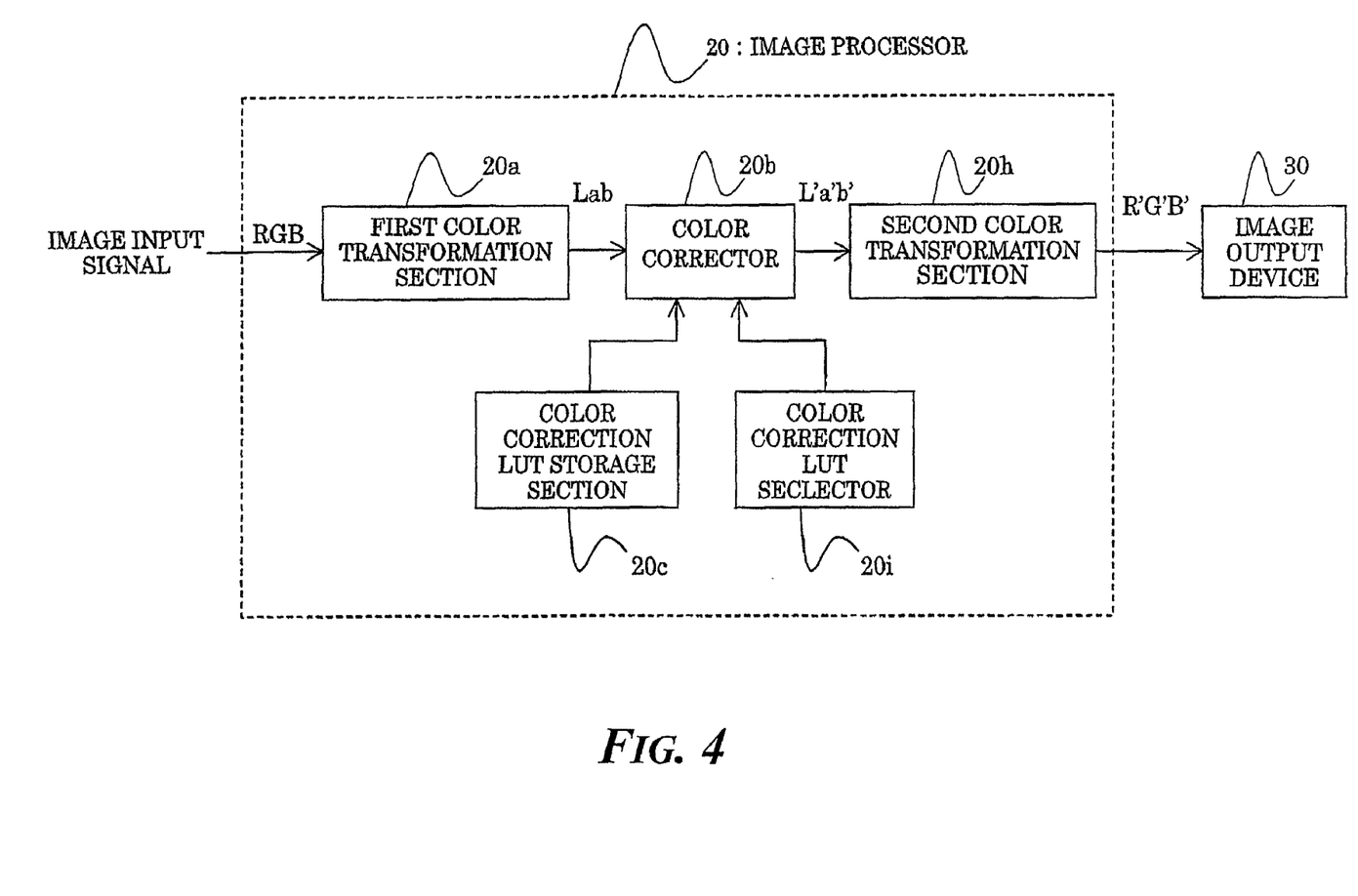
FIG. 4 is a functional block diagram of an image processing device according to an embodiment of the present invention.

FIG. 4 is a functional block diagram showing an image processing device according to an embodiment of the present invention.

Hardware Construction

Figure 3:
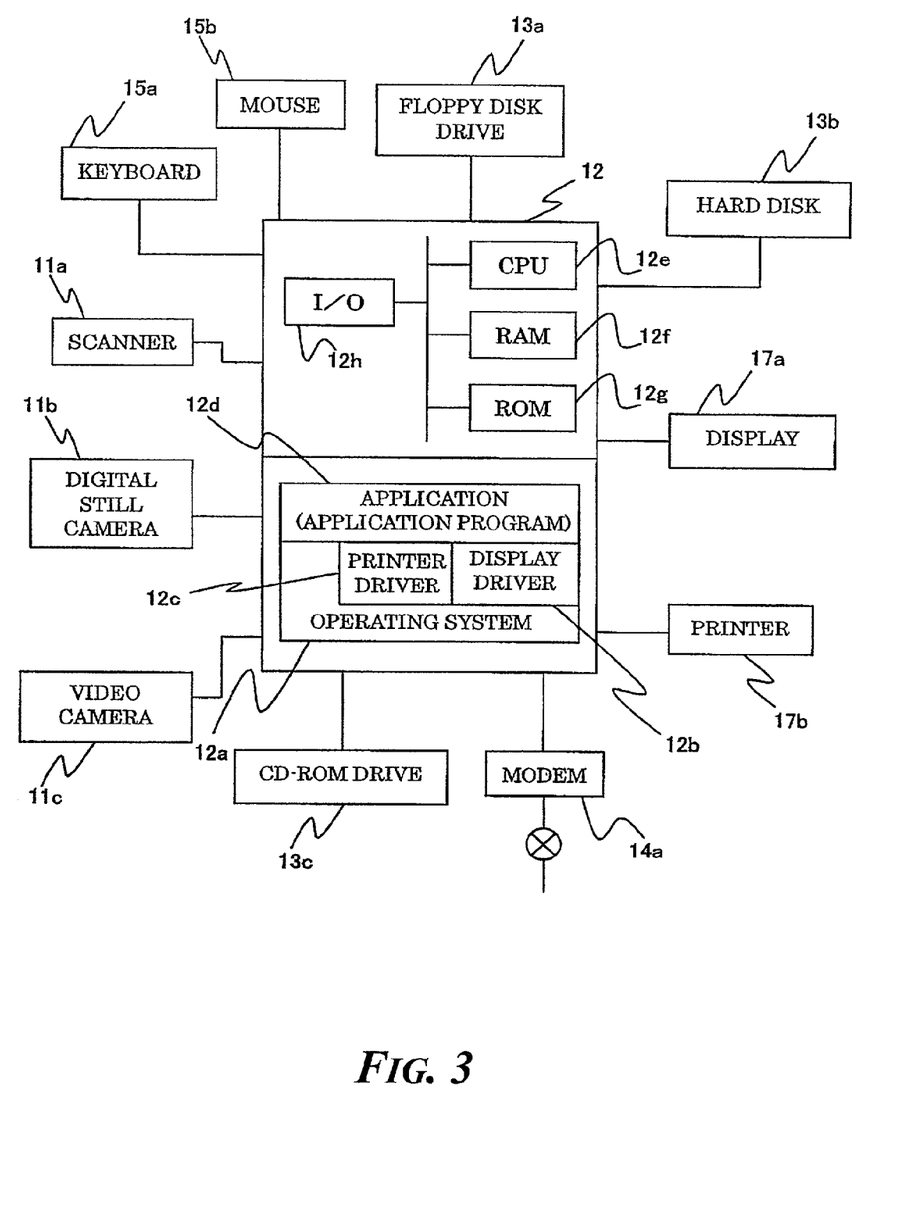
FIG. 3 is an outline block diagram constituting an example of a specific hardware of a color correction table generating device and an image processing device according to an embodiment of the present invention.

FIG. 3 shows an example of a concrete hardware construction about these color correction table generating device and the image processing device by an outlined block diagram.

The present embodiment employs a computer system as an example of hardware for realizing the color-correction table generating device and the image processing device. FIG. 3 shows the computer system as a block diagram. The computer system is provided with a scanner 11a, a digital A still camera 11b, and a video camera 11c as image input devices, and they are connected with a computer main unit 12. The individual input devices generate an image data where an image is represented by pixels arranged as dot matrix, and provide the computer main unit 12 with the image data, where the image data represents about 16.7 million colors by 256-gradation display in three primary colors comprising R, G, and B.

A floppy disk drive 13a, a hard disk drive 13b, and a CD-ROM drive 13c are connected with the computer main unit 12 as external auxiliary storage apparatuses, the hard disk 13b stores base programs relating to the system, and necessary programs are read from a floppy disk and a CD-ROM if required. A modem 14a is connected as a communication device for connecting the computer main unit 12 with an external network or the like, and thus connecting to the external network through a public communication line enables software and data to be downloaded for installation. In this example, though the modem 14a is used for the external access through the telephone line, a constitution for access to a network through a LAN adaptor is also possible. In addition, a keyboard 15a and a mouse 15b are connected for operating the computer main unit 12.

The computer main unit 12 is provided with a display 17a and a color printer 17b as image output devices. The display 17a is provided with a display area comprising 800 pixels in the horizontal direction and 600 pixels in the vertical direction, and 16.7 million colors are displayed on the individual pixels. This resolution is an example, and the resolution may be changed to 640×480 pixels or 1024×768 pixels as needed.

The color printer 17b is an ink jet printer, and prints an image by putting dots on a print sheet as a medium with color ink of four colors comprising C, M, Y, and K. As its image resolution, high density print such as 360×360 dpi or 720×720 dpi is available, and as its gradation representation, two-gradation representation by selecting whether attaching the color ink or not is available. A predetermined program is running on the computer main unit 12 to obtain an image through the image input devices, and to display or to provide the image on the image output device. An operating system (OS) 12a operates as a base program, and a display driver (DSP DRV) 12b for displaying on the display 17a and a printer driver (PRT DRV) 12c for performing print output at the color printer 17b are integrated into the operating system 12a. The drivers 12b and 12c depend on the models of display 17a and the color printer 17b, and are added to or changed in the operating system 12a according to the models. It is also possible to realize a feature in addition to a standard processing depending on the models. In other words, different additional processes are realized within a permissible extent while a processing system which is to be common on the operating system 12a, i.e. a standard system remains unchanged.

As a prerequisite for running the program, the computer main unit 12 is provided with a CPU 12e, a RAM 12f, a ROM 12g, an I/O 12h and the like, and the CPU 12e executes the base program written in the ROM 12g as needed while using the RAM 12f as a temporary work area or specified memory area, or a program area, and controls the external apparatuses connected through the I/O 12h and internal apparatuses.

The application 12d is executed on the operating system 12a, which serves as the base program. Contents of the processing in application 12d vary, and include monitoring the operation of keyboard 15a and the mouse 15b as operating devices, properly controlling the different external apparatuses, executing corresponding calculation and the like when they are operated, and displaying or providing a processed result on the display 17a or the color printer 17b.

The computer system obtains image data through the scanner 11a or the like as an image input device, performs a predetermined image processing with the application 12d, and show the processed result as output on the display 17a or the color printer 17b, which serve as image output devices.

Although in this embodiment the image processing device is implemented as a computer system, such a computer system is not always required, but the system to which the image processing device is applied may be any other system which requires the image processing of the present invention for the same image data. For example, there may be adopted a system wherein the image processing device according to the present invention is built into a digital still camera and printing is performed by a color printer using image data after image processing. In a color printer which inputs and prints image data without going through a computer system, there may be adopted a construction wherein the image processing according to the present invention is performed for image data which are inputted through a scanner, a digital still camera, a modem or the like, followed by the execution of a printing process.

Of course, the present invention is also applicable to various other devices which handle image data, such as color facsimile devices, color copiers, and projectors.

Image Processing Control Program

The image processing control program according to the present invention is usually distributed in a stored state on a recording medium such as a floppy disk or a CD-ROM so that it can be read by the computer 12. The program is read by a media reader (e.g. CD-ROM drive 13c or floppy disk drive 13a) and is installed in the hard disk 13b. Then, a CPU reads a desired program from the hard disk 13b and executes a desired processing. The image processing control program itself according to the present invention also constitutes a part of the present invention.

Color Correction Table Generating Device

First Embodiment

The first color correction table generating device 20A generates a color correction table for making a faithful color reproduction.

When an image input signal is reproduced by using a display device such as a projector or the like, a color space of an input image signal is different from that of the display device, and therefore, it is necessary to make a color transformation.

Figure 8:
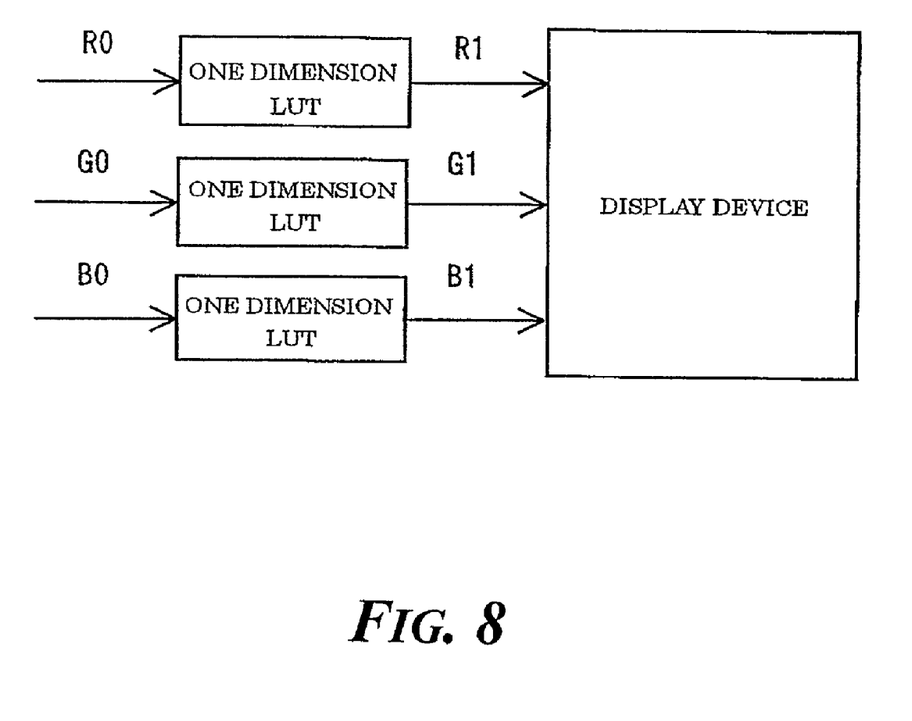
FIG. 8 is a diagram for explaining an example of a color transforming method of a display device.
Figure 9:
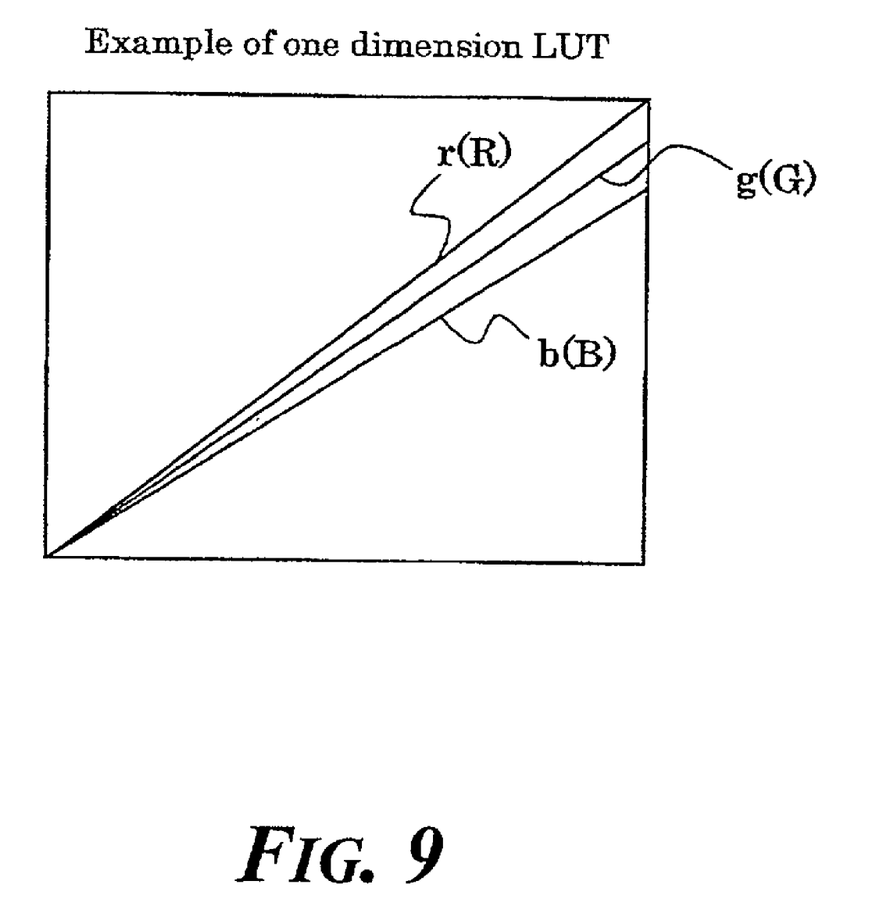
FIG. 9 is a graph for showing color correction curves of r(R), g(G) and b(B) used for a color transforming method.

There is a method of a color transformation of the display device, which uses a color correction of one dimension. FIG. 8 is a drawing for explaining an example of a color transforming method of the display device. In the color transforming method as shown in FIG. 8, a color balance and a brightness property of the display device are corrected by one dimensional color correction tables of RGB. For example, for correcting a chromaticity of white of the display device, color correction curves of r(R), g(G) and b(B) differ respectively as shown in FIG. 9.

Figure 10:
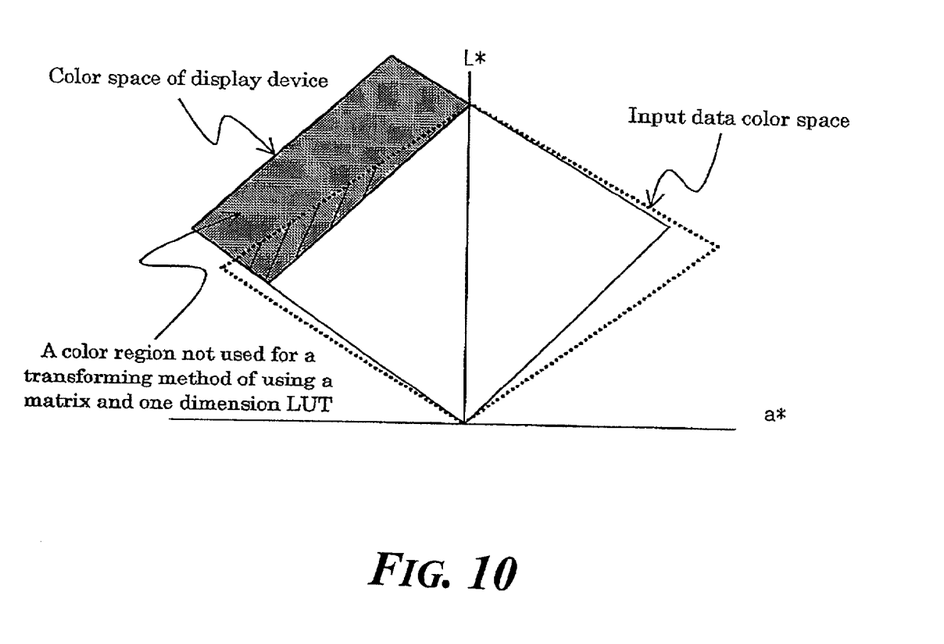
FIG. 10 is a drawing for explaining a problem with respect to a color transforming method.

However, according to this color transforming method, a range of brightness of R, G, B used in the display device is determined by output of the one dimensional color correction tables at the time of a maximum input, i.e. that is a balance of a white point. Therefore, an area as the dot area shown in FIG. 10 having a brightness more than the range is not used. Thereby, when color of image input signals is reproduced by the display device, there is a case that the color space of the display device cannot be utilized adequately. Furthermore, it is impossible to perform an accurate color transformation by the color correction using the one dimensional color correction tables.

The first color correction table generating device 20A generates a color correction table for making a color correction able to effect a faithful color reproduction even at the sacrifice of lightness. Thus, in this color correction, priority is given to the reproduction of color.

In FIG. 1, a first color correction table generating device 20A is provided with: a first color space transformation section 20d, a second color space transformation section 20e, a scaling section 20f, a third color space transformation section 20g and a color correction LUT storage section 20c for storing a generated color correction LUT. The processing of these each structures section will be described below in detail.

Figure 5:
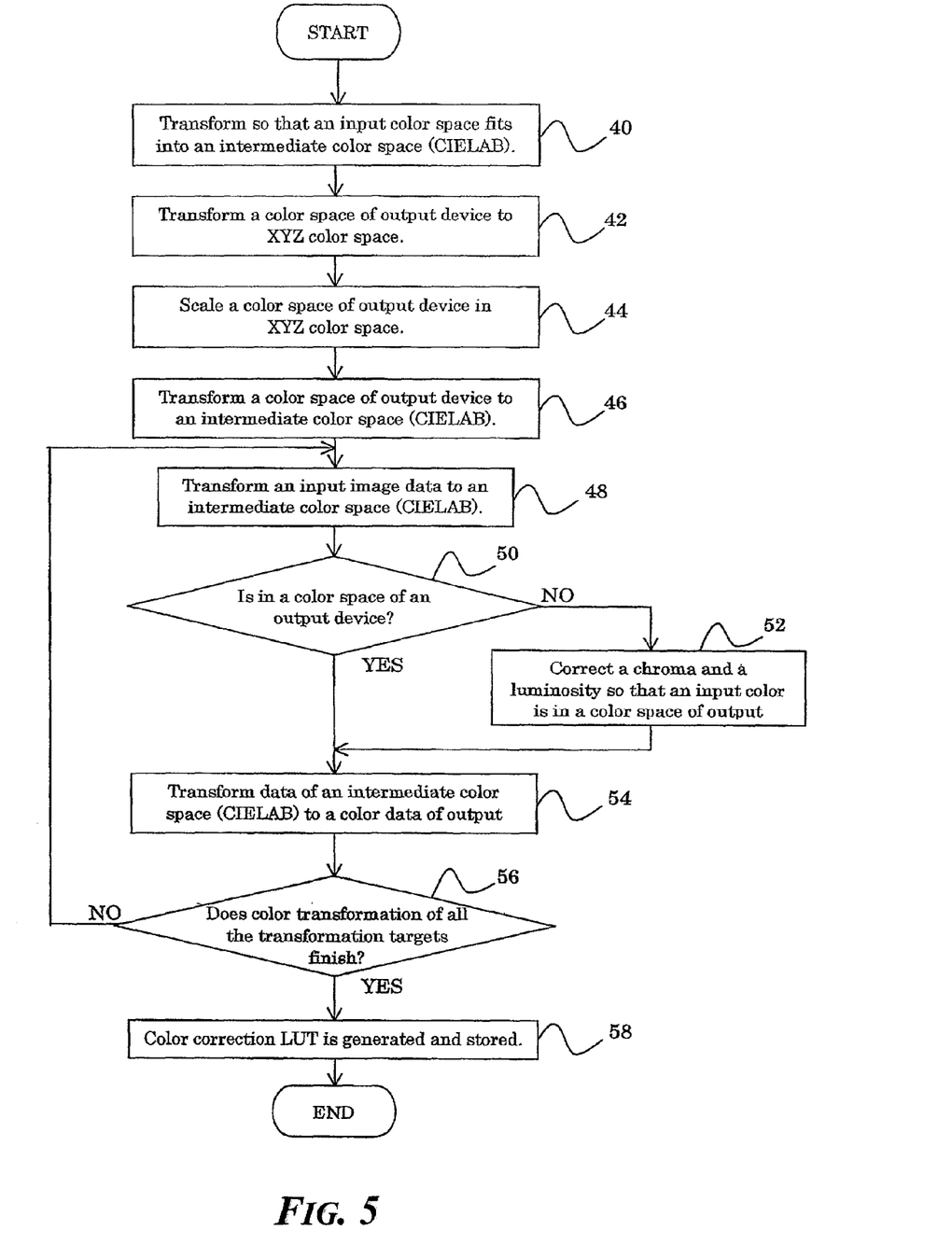
FIG. 5 is a flowchart for explaining a color correction table generating process of a first color correction table generating device 20A.
Figure 6:
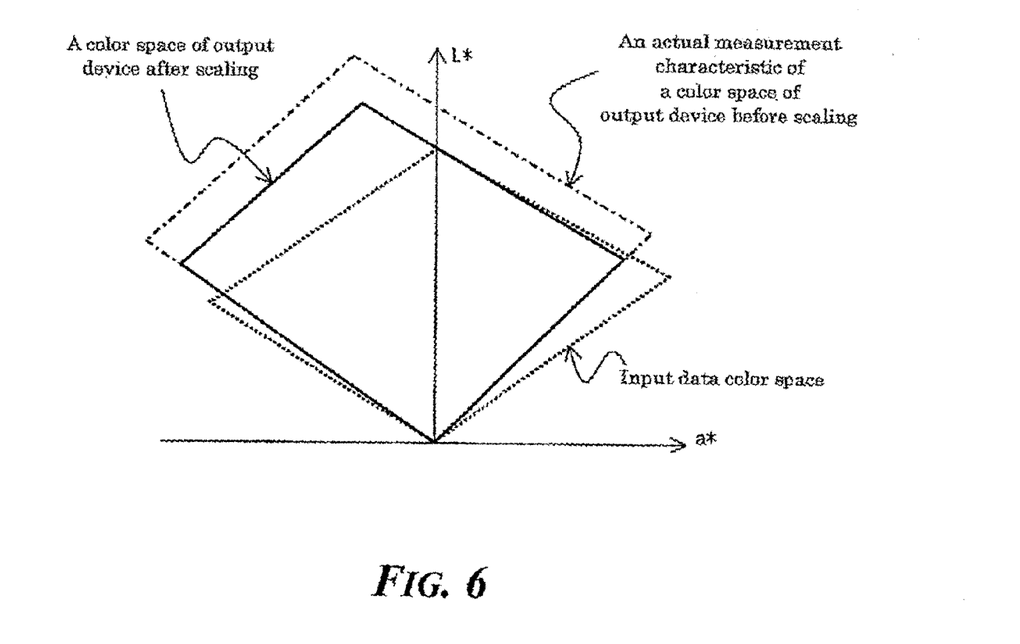
FIG. 6 is a drawing for explaining a relationship between an input data color space and an output device color space.

Referring to FIGS. 5 and 6, a color correction table generating process program which is executed by the first color correction table generating device 20A shown in FIG. 1 is explained hereinafter.

FIG. 5 is a flowchart explaining the color correction table generating process program executed by the first color correction table generating device 20A.

As shown in FIG. 5, the first color space transformation section 20d of the first color correction table generating device 20A makes a transformation so that an input data color space (a color space of an image input signal) matches an intermediate color space (CIELAB) (step 40). With respect to this embodiment, the following explanation will be made in a case where the intermediate color space is a CIELAB space. As the intermediate color space, a CIELUV space may be used as well as the CIELAB space.

[Formula 1]

$$\begin{pmatrix} Xa \\ Ya \\ Za \end{pmatrix} = A \begin{pmatrix} Ra \\ Ga \\ Ba \end{pmatrix} = \begin{pmatrix} a11 & a12 & a13 \\ a21 & a22 & a23 \\ a31 & a32 & a33 \end{pmatrix} \begin{pmatrix} Ra \\ Ga \\ Ba \end{pmatrix} \quad (1)$$

If color images having the color characteristics shown by the above expression (1) is displayed by a display device having the color characteristics shown by the following expression (2),

[Formula 2]

$$\begin{pmatrix} Xb \\ Yb \\ Zb \end{pmatrix} = B \begin{pmatrix} Rb \\ Gb \\ Bb \end{pmatrix} = \begin{pmatrix} b11 & b12 & b13 \\ b21 & b22 & b23 \\ b31 & b32 & b33 \end{pmatrix} \begin{pmatrix} Rb \\ Gb \\ Bb \end{pmatrix} \quad (2)$$

first of all, the input data color space is transformed to the CIELAB space which is the intermediate color space At this time, the expression (1) is used to transform RGB values to tri-stimulus XYZ values. The following equations are used to transform the tri-stimulus XYZ values to the CIELAB space.

[Formula 3]

$$L^* = 116(Y/Yn)^{1/3} - 16 \text{ if } Y/Yn > 0.008856 \quad (3)$$

$$L^* = 903.29(Y/Yn) \text{ if } Y/Yn \leq 0.008856 \quad (4)$$

$$a^* = 500[(X/Xn)^{1/3} - (Y/Yn)^{1/3}] \quad (5)$$

$$b^* = 500[(Y/Yn)^{1/3} - (Z/Zn)^{1/3}] \quad (6)$$

Here, Xn, Yn and Zn are tri-stimulus values with respect to white of input signal.

Next, with respect to the color space (color reproduce area) of the output device, the second color space transformation section 20e transforms RGB values to XYZ values by the expression (2) (step 42). The scaling section 20f executes a scaling in a XYZ coordinate in accordance with the following equation:

[Formula 4]

$$\begin{pmatrix} Xb' \\ Yb' \\ Zb' \end{pmatrix} = c \begin{pmatrix} Xb \\ Yb \\ Zb \end{pmatrix} \quad (7)$$

so that a white point of the input data color space corresponds to a point having the same chromaticity as the white point of the input data color space and having the maximum brightness in the output device color space in the CIELAB space (step 44).

Here, the scaling changes a scale size of color space. Furthermore, in xy chromaticity coordinate, a chromaticity (x, y) is defined by the following equations:

$$x = X/(X+Y+Z)$$

$$y = Y/(X+Y+Z)$$

Here, "c" is a scaling constant, and is calculated by the following equations:

[Formula 5]

$$\begin{pmatrix} r1 \\ g1 \\ b1 \end{pmatrix} = B^{-1} \begin{pmatrix} Xaw \\ Yaw \\ Zaw \end{pmatrix} \quad (8)$$

and

[Formula 6]

$$c = \frac{1}{\text{Max}(r1, g1, b1)} \quad (9)$$

With respect to the scaled XYZ values, the third color space transformation section 20g applies the above transform equations to the CIELAB space (the expressions (3) to (6)) and transforms the color space of the output device to the CIELAB space (step 46). The relationship between the input data color space and the output device color space which are transformed is shown in FIG. 6.

Further, the third color space transformation section 20g performs a color transformation processing for RGB values of a lattice point in the three-dimensional color correction table (steps 48–56). RGB values of a lattice point in the three-dimensional correction table are transformed into CIELAB coordinates in accordance with the equations (1) and (3) to (6).

In the case where a desired color is present within the color space of the output device (step 50, Yes), the data in the CIELAB space is transformed into (XYZ) by inverse transformation of the equations (3) to (6), followed by further transformation into color data of the output device in accordance with the following equation so as to calculate RGB values of the output device (step 54):

[equation 7]

$$\begin{pmatrix} r \\ g \\ b \end{pmatrix} = B^{-1} \frac{1}{C} \begin{pmatrix} X \\ Y \\ Z \end{pmatrix} \quad (10)$$

On the other hand, if a required color does not exist in the color space of the output device (step 50, No), a lightness and a chroma of the required color are changed and the required color is transferred into the color space of the output device (step 52). Thereafter, (X', Y', Z') is calculated by using an inverse transformation of the expressions (3) to (6) and RGB values of the output device are calculated by the expression (10) (step 54).

After the color transformation processing of the steps 48 to 54 are repeated with respect to RGB values of all the transformation targets (step 56, Yes), a three dimensional color correction table with priority to color reproduction is generated, stored in the color correction LUT storage section 20c (step 58) and the processing is finished.

Second Embodiment

A second color correction table generating device 20B generates a color correction table for making a color correction with priority to brightness. In FIGS. 1 and 2, the same components are identified by the same reference numerals. In FIG. 2, the second color correction table generating device 20B is provided with a first color space transformation section 20d, a second color space transformation section 20e, a fourth color space transformation section 20j, a third color space transformation section 20g, and a color correction LUT storage section 20c for the storage of a generated color correction LUT. As to the details of processing in each of these components, a description will be given later. The components of the second color correction table generating device 20B are the same as those of the first color correction table generating device 20A except that the scaling section 20f in the first color correction table generating device 20A is replaced with the fourth color space transformation section 20j.

Now, with reference to FIGS. 11 and 12, a description will be given below about a color correction table generation process program which is carried out by the second color correction table generating device 20B shown in FIG. 2.

Figure 11:
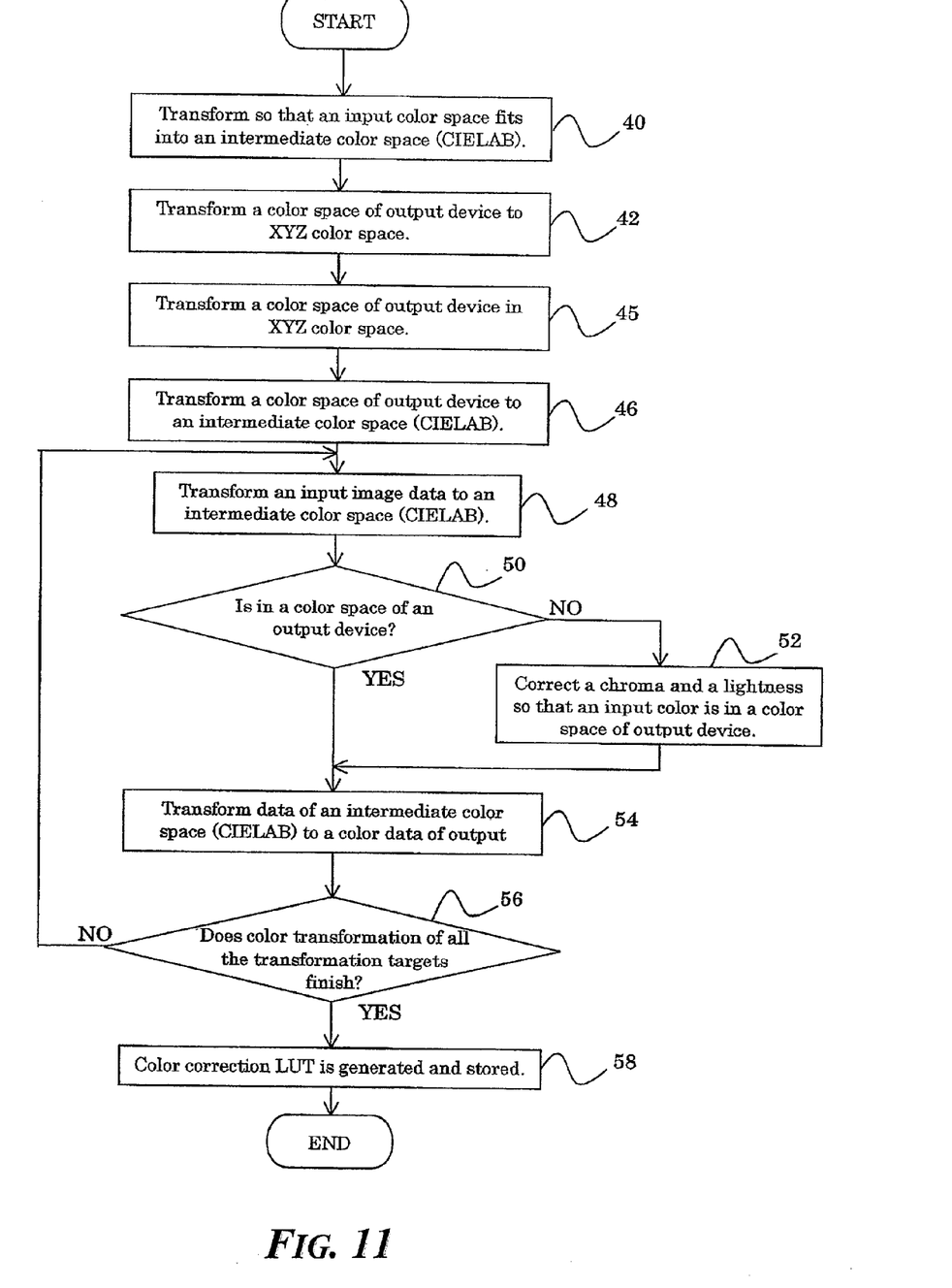
FIG. 11 is a flowchart for explaining a color correction table generating process program of a second color correction table generating device 20B.
Figure 12:
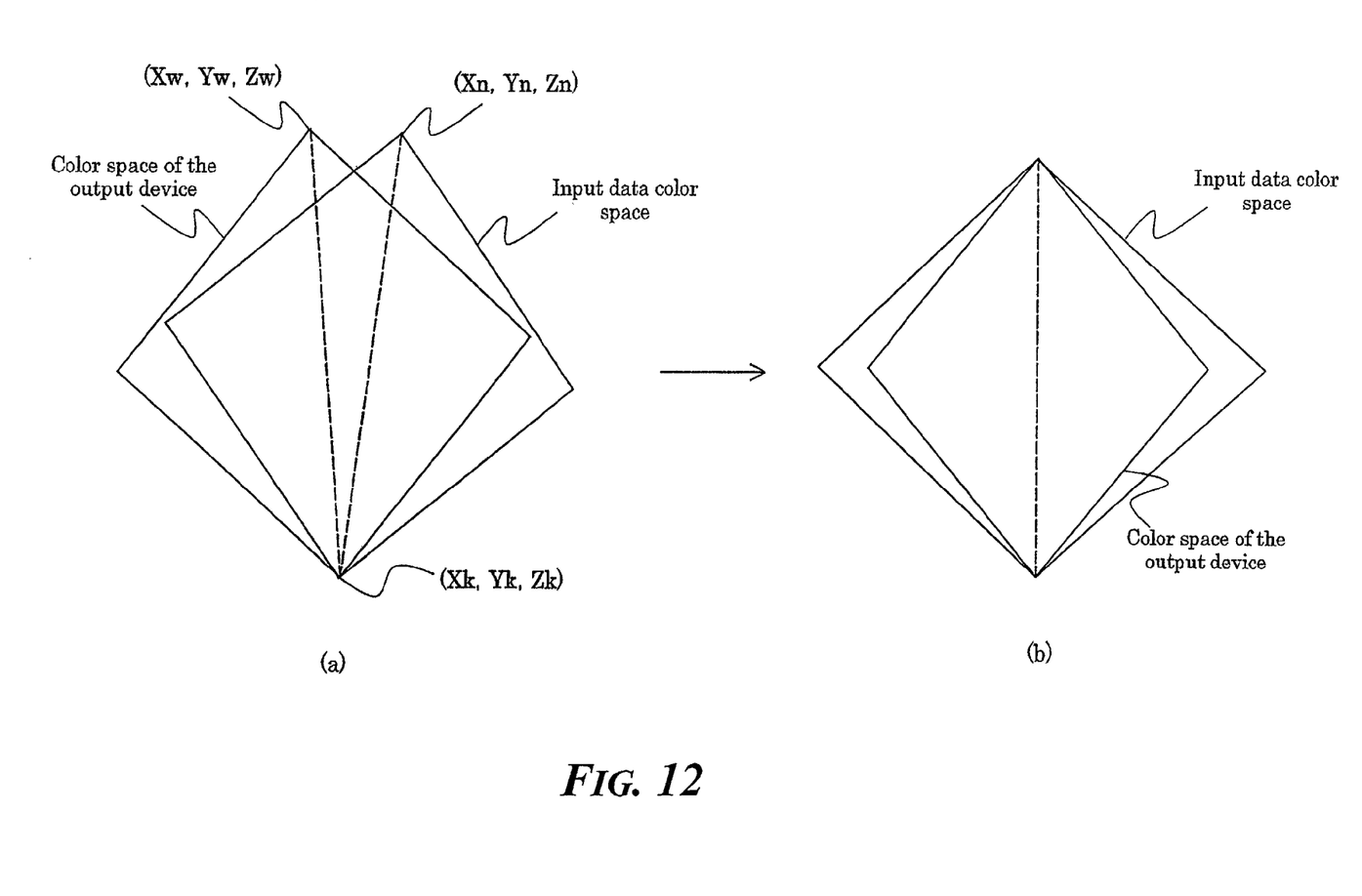
FIG. 12(a) is a diagram showing a relation between a color space of input data and a color space of an output device before transformation and FIG. 12(b) is a diagram showing a relation between the input data color space and the output device color space after transformation.

FIG. 11 is a flow chart for explaining the color correction table generation process program carried out by the second color correction table generating device 20B.

The color correction table generation process program carried out by the second color correction table generating device 20B shown in FIG. 11 is the same as that shown in FIG. 5 except that the processing of step 44 in the color correction table generation process program carried out by the first color correction table generating device 20A shown in FIG. 5 is replaced with the processing of step 45 in FIG. 11. Therefore, the processings common to FIGS. 5 and 11 will be identified by the same reference numerals.

As shown in FIG. 11, the first color space transformation section 20d of the second color correction table generating device shown in FIG. 2 makes a transformation so that an input data color space matches an intermediate color space (CIELAB) (step 40).

As well as the first embodiment, when color images having the color characteristics shown by the expression (1) is displayed by a display device having the color characteristics shown by the expression (2), the input data color space is transformed to the CIELAB space which is the intermediate color space. At this time, the expression (1) is used to transform RGB values to tri-stimulus XYZ values. The equations (3)–(6) are used to transform the tri-stimulus XYZ values to the CIELAB space. Here, Xn, Yn and Zn are tri-stimulus values with respect to white of input signal. Next, with respect to the color space (color reproduce area) of the output device, the second color space transformation section 20e transforms RGB values to XYZ values by the expression (2) (step 42).

In the second embodiment, unlike the first embodiment, the fourth color space transformation section 20j transforms (X, Y, Z) into (X', Y', Z') in accordance with the following equations in an XYZ coordinate system so that the white color point in the input data color space and the white color point in the output device color space are approximately coincident with each other in a CLELAB space (step 44):

$$X'=\{Xn/(Xw-Xk)\}/(X-Xk) \quad (8)$$

$$Y'=\{Yn/(Yw-Yk)\}/(Y-Yk) \quad (9)$$

$$Z'=\{Zn/(Zw-Zk)\}/(Z-Zk) \quad (10)$$

As a result, white and black color points in the input data color space and the output device color space become substantially coincident with each other. In the above equations, Xw, Yw, and Zw are tri-stimulus values in the white color in the output device color space, while Xk, Yk, and Zk are tri-stimulus values in the black color in both input data color space and output device color space.

With respect to the transformed XYZ values, the third color space transformation section 20g applies the above transform equations (3) to (6) for the CIELAB space so as to transform the color space of the output device to the CIELAB space (step 46). The relationship before the transformation between the input data color space and the output device color space which are transformed is shown in FIG. 12(a), and the relationship after the transformation between the input data color space and the output device color space which are transformed is shown in FIG. 12(b). After the color transformation, lightness can be retained while a slight color difference is caused. Namely, a color correction with priority to brightness can be performed.

Further, the third color space transformation section 20g performs a color transformation processing for RGB values of a lattice point in the three-dimensional color correction table (steps 48–56). RGB values of an input image data are transformed into CIELAB coordinates in accordance with the equations (1) and (3) to (6).

In the case where a desired color is present within the color space of the output device (step 50, Yes), the data in the CIELAB space is transformed into (XYZ) by inverse transformation of the equations (3) to (6), followed by further transformation into color data of the output device in accordance with the equation (10), and RGB values of the output device are calculated (step 54).

On the other hand, if a required color does not exist in the color space of the output device (step 50, No), a lightness and a chroma of the required color are changed and the required color is transferred into the color space of the output device (step 52). Thereafter, (X', Y', Z') is calculated by using an inverse transformation of the expressions (3) to (6) and RGB values of the output device is calculated by the expression (10) (step 54).

After the color transformation processing of the steps 48 to 54 are repeated with respect to RGB values of all the transformation targets (step 56, Yes), a three dimensional color correction table with priority to brightness is generated, and stored in the color correction LUT storage section 20c (step 58). Then, the processing is finished.

Image Processing Device

In FIG. 4, the image processing device 20 executes a desired image processing to RGB image input data and outputs the image-processed image data to the image output device 30. Here, the image data is that a color image is divided into predetermined color components and respective components represent gradations of the respective colors, and the data has a chromatic color or an achromatic color such as gray and black, if it is mixed in a predetermined ratio. The present embodiment will be explained in the case where the image output device 30 such as a display reproduces a color based on RGB data.

The image processing device 20 is provided with a first color transformation section 20a for transforming an RGB image input signal into Lab data, a color correction LUT storage section 20c which stores at least the color correction table with priority to color reproduction which has been generated by the first color correction table generating device 20A and the color correction table with priority to brightness which has been generated by the second color correction table generating device 20B, a color corrector 20b which reads a color correction table (LUT) selected by a color correction LUT selector 20i from the color correction LUT storage section 20c and which transforms Lab data into L'a'b' data by reference to the thus-read color correction LUT, and a second color transformation section 20h for transforming the L'a'b' data into R'G'B' data.

Next, with referring to FIG. 7, the operation of the image processing device 20 is explained hereinafter.

Figure 7:
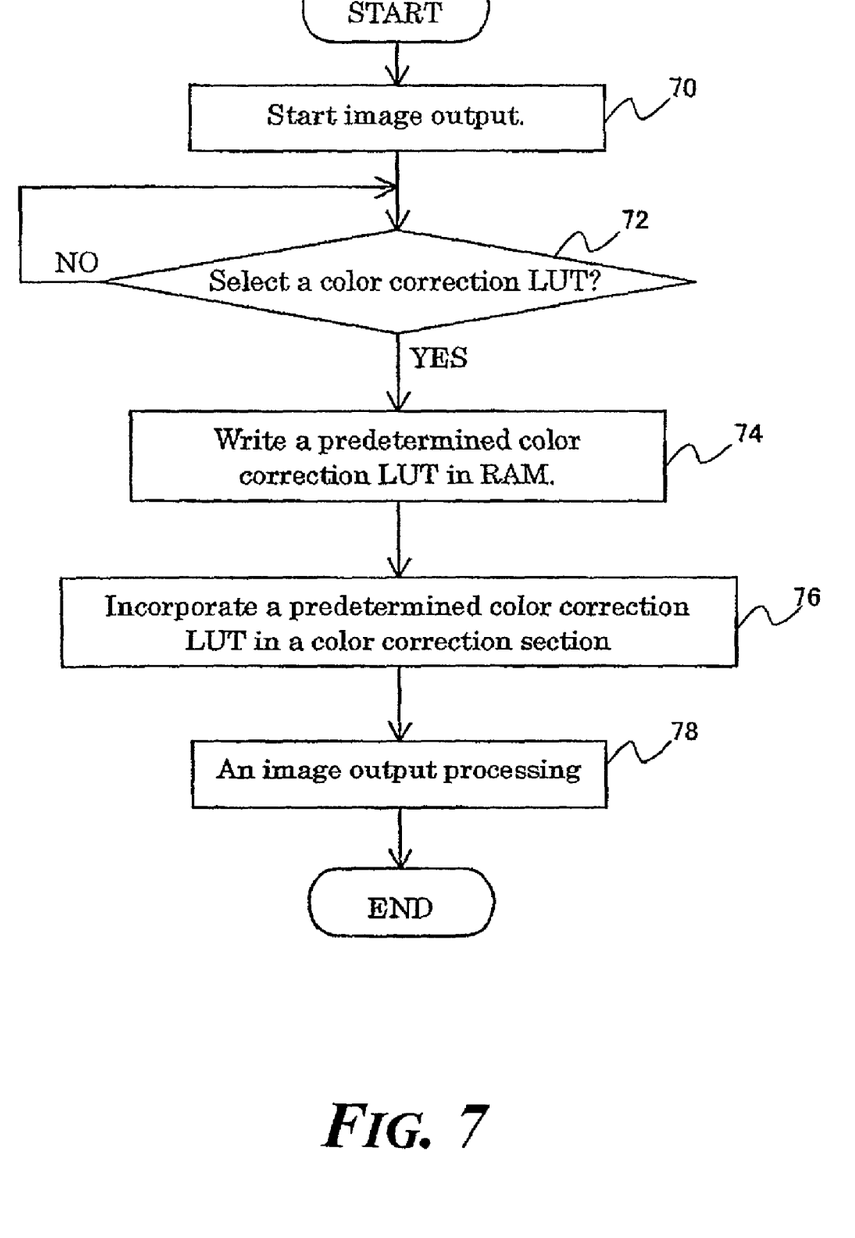
FIG. 7 is a flowchart for explaining an operation of an image processing device 20.

As shown in FIG. 7, if the start of an image output is instructed by a user (step 70) and if a predetermined three dimensional color correction LUT is selected (step 72, Yes), the selected three dimensional color correction LUT is read out from the color correction LUT storage section 20c and it is written into a RAM (step 74). The three dimensional color correction LUT is incorporated in the color correction section 20b (step 76), an image processing is executed by using an interpolation calculation with referring to the three dimensional color correction LUT, and an image output processing is executed (step 78).

Although this embodiment is constructed so that in step 72 a desired LUT can be selected using the color correction LUT selector 20i in accordance with user's preference or a desired use of the user, there may be adopted a construction wherein a predetermined color correction table is selected in accordance with an input signal. As an example, there may be adopted a construction such that in the case of an image input signal fed from a terminal for a computer signal, a color correction table with priority to brightness is selected, while in the case of an image input signal fed from a terminal for a video signal, a color correction table with priority to color reproduction is selected. This is for the following reason. In the case of an input signal provided from a terminal for a computer signal, the retention of brightness is preferred because it is presumed that much character data will be contained therein, while in the case of an input signal provided from a terminal for a video signal, a faithful color reproduction is preferred because natural pictures are reproduced in many cases.

According to the color correction in this embodiment, since it is possible to select a color correction table with priority to color reproduction or a color correction table with priority to brightness at the time of reproducing the color of an image input signal in the output device, it is possible to effect the reproduction of color so as to match the user's desire and the purpose of use.

The invention claimed is:

1. An image processing device for supplying an image input signal to an image output device after said image input signal has been subjected to a desired color correction using a color correction table, said image processing device comprising:
   a first color correction table for color correction with priority to color reproduction; and
   a second color correction table for color correction with priority to brightness;
   wherein said first color correction table transforms a color point in a color space of the image input signal into a color point in a color space of the image output device, in a color space constructed such that a white color point in a color space of an input image data is substantially coincident with a maximum luminance point having the same chromaticity as that of said white color point and having a maximum luminance in the color space of the image output device.

2. The image processing device according to claim 1, wherein said second color correction table transforms a color point in the color space of the image input signal into a color point in the color space of the image output device, in a color space constructed such that the white color point in the color space of the input image data is substantially coincident with a white color point in the color space of the image output device.

3. The image processing device according to claim 1, further comprising:
   selector means for selecting either said first or said second color correction table, wherein the desired color correction is performed using the color correction table selected by said selector means.

4. The image processing device according to claim 3, wherein said selector means selects either said first or said second color correction table in accordance with the image input signal.

5. The image processing device according to claim 4, wherein the second color correction table is selected in the case where said image input signal is fed from a terminal for a computer signal.

6. The image processing device according to claim 4, wherein the first color correction table is selected in the case where said image input signal is fed from a terminal for a video signal.

7. An image processing method, comprising:
   receiving an image input signal;
   performing a desired color correction on said image input signal using a color correction table; and
   after said desired color correction, supplying said color-corrected image input signal to an image output device;
   wherein said color correction table used in said desired color correction is one of
   a first color correction table for color correction with priority to color reproduction; and
   a second color correction table for color correction with priority to brightness; and
   wherein said first color correction table transforms a color point in a color space of the image input signal into a color point in a color space of the image output device, in a color space constructed such that a white color point in a color space of an input image data is substantially coincident with a maximum luminance point having the same chromaticity as that of said white color point and having a maximum luminance in the color space of the image output device.

8. The method according to claim 7, wherein said second color correction table transforms a color point in the color space of the image input signal into a color point in the color space of the image output device, in a color space constructed such that the white color point in the color space of the input image data is substantially coincident with a white color point in the color space of the image output device.

9. The method according to claim 7, further comprising selecting either said first or said second color correction table, wherein the desired color correction is performed using the selected color correction table.

10. The method according to claim 9, wherein said selecting is performed in accordance with the image input signal.

11. The method according to claim 10, wherein the second color correction table is selected in the case where said image input signal is fed from a terminal for a computer signal.

12. The method according to claim 10, wherein the first color correction table is selected in the case where said image input signal is fed from a terminal for a video signal.

13. A computer-readable medium storing a computer program of instructions for execution by a computer to perform an image processing, said image processing comprising:
   receiving an image input signal;
   performing a desired color correction on said image input signal using a color correction table; and
   after said desired color correction, supplying said color-corrected image input signal to an image output device;
   wherein said color correction table used in said desired color correction is one of
   a first color correction table for color correction with priority to color reproduction; and a second color correction table for color correction with priority to brightness; and wherein said first color correction table transforms a color point in a color space of the image input signal into a color point in a color space of the image output device, in a color space constructed such that a white color point in a color space of an input image data is substantially coincident with a maximum luminance point having the same chromaticity as that of said white color point and having a maximum luminance in the color space of the image output device.

14. The computer-readable medium according to claim 13, wherein said second color correction table transforms a color point in the color space of the image input signal into a color point in the color space of the image output device, in a color space constructed such that the white color point in the color space of the input image data is substantially coincident with a white color point in the color space of the image output device.

15. The computer-readable medium according to claim 13, wherein said processing further comprises selecting either said first or said second color correction table, wherein the desired color correction is performed using the selected color correction table.

16. The computer-readable medium according to claim 15, wherein said selecting is performed in accordance with the image input signal.

17. The computer-readable medium according to claim 16, wherein the second color correction table is selected in the case where said image input signal is fed from a terminal for a computer signal.

18. The computer-readable medium according to claim 16, wherein the first color correction table is selected in the case where said image input signal is fed from a terminal for a video signal.

* * * * *